Sept. 2, 1969      W. M. PARTHUM      3,465,107
MICROPHONE WITH MOUNTING FRAME OF PREFIXED COMPONENTS
Filed Aug. 10, 1965
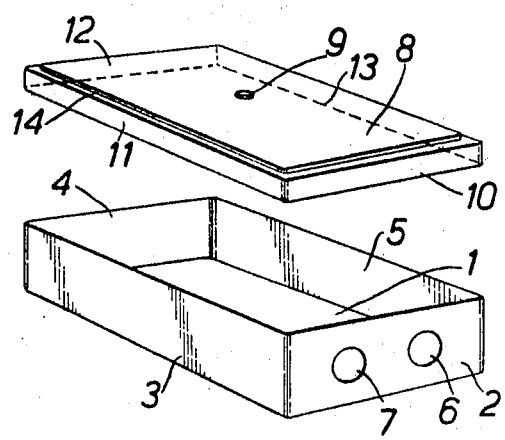
FIG. 1.
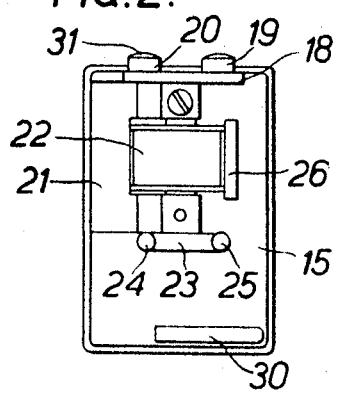 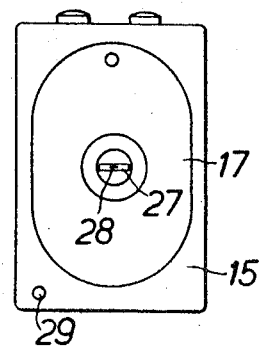
FIG. 2.     FIG. 3.
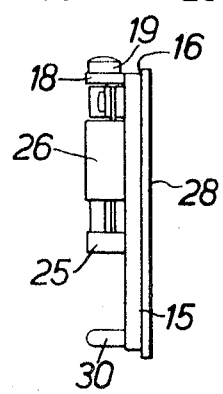
FIG. 4.
INVENTOR
WERNER MANFRED PARTHUM
BY nolte & nolte
ATTORNEYS 3,465,107
MICROPHONE WITH MOUNTING FRAME OF
PREFIXED COMPONENTS
Werner Manfred Parthum, Kongens Lyngby, Denmark,
assignor to Danavox International A/S, Copenhagen,
Denmark
Filed Aug. 10, 1965, Ser. No. 478,592
Claims priority, application Denmark, Aug. 12, 1964,
3,978/64
Int. Cl. H04r 25/00; H04m 1/02
U.S. Cl. 179—179                                     4 Claims

ABSTRACT OF THE DISCLOSURE

A microphone having a bipartite housing with a frame supported between the two parts. The components are previously mounted on the frame whereby the frame is mounted in the housing without a soldering operation and the terminals of the frame are accessible from the exterior of the housing since they project through corresponding openings in the housing.

---

The invention relates to microphones, especially for hearing aids, or corresponding apparatus, and of the type where a plurality of components are mounted on a preferably plate-formed frame placed in a housing in the walls of which are located through conduits.

A device of the aforesaid type is known in which the plate-formed frame consisting of sheet metal on one side has a flat depression over which a diaphragm is extended. An electromaget is fixed on the opposite side. The housing is of metal, and two holes are arranged in the wall thereof, in which are fixed two terminals insulated from the housing. After the mounting of the diaphragm and the magnet on the frame, this mounting unit is mounted in the housing. The wires from the magnet have a suitable length, and the mounting unit is kept at a small distance from the final position in the housing during the soldering of the wires to the terminals. The mounting unit is then placed on its location in the housing. This mounting method incurs the risk that the diaphragm may be damaged during the soldering operation. Furthermore it is rather difficult to carry out the soldering since this has to be accomplished within the housing.

It is an object of the invention to provide an arrangement of the above kind, in which the above drawbacks are avoided, and in which no difficulties arise during the soldering operation. The arrangement according to the invention is characterized in a frame having its own terminals preferably in the form of projections, the housing having corresponding apertures into which the projections extend or through which the conduits are carried. In this manner, the frame can be completely mounted, and the magnet coil conduits are soldered to the terminals before placing the mounting unit in the housing. Thus a simpler and a more inexpensive mounting of the complete apparatus is achieved. Furthermore, the diaphragm can be mounted after the soldering so that no risk of damaging the diaphragm during the soldering operation exists.

According to the invention the housing may, in a known manner, be of metal and the terminals be surrounded by insulating sleeves. In this way a simple and practical construction is obtained. Moreover, the preferably plate-formed frame may according to the invention consist of a plastic part. Such a part can be produced cheaply and it is easy to fasten components on it, for example, by gluing, whereas the fastening of the components on the hitherto known frames of metal sheet necessitates a securing by screws or by other securing means resulting in a considerable increase in the cost of producing the device. The frame may, according to the invention, comprise supporting or guiding projections for the components. Such projections can be produced easily and more inexpensively in a plastic frame, especially by well-known injection molding techniques, and the mounting of the components will be considerably facilitated by such projections.

In the accompanying drawings there is shown an example of a microphone according to the invention, in which FIG. 1 is a perspective view of a housing comprising two parts and shown in an exploded form, FIG. 2 is a front elevation view of a plate formed mounting frame with components, FIG. 3 is a rear elevation view of the plate-formed mounting frame with components, and FIG. 4 is a side elevation view of the plate-formed mounting frame as seen from the left side of FIG. 2.

The housing shown in FIG. 1 consists of a lower part with a planar bottom 1 and four upwards extending side walls 2, 3, 4, and 5. In the wall 2 are arranged two circular holes 6 and 7. In addition the housing comprises a cover consisting of a plane bottom 8, having in its middle portion a small circular hole 9, and four downwardly extending side walls 10, 11, 12 and 13, fitting over the side walls 2, 3, 4 and 5 respectively. Between the bottom 8 and the side walls 10–13 is a circumferentially extending impression 14, providing an internal abutment surface.

In FIGS. 2–4 there is shown an essentially plate formed plastic frame. The frame is formed with a plate 15 the length and width of which are equal to the length and width of the lower part of the housing 1–5. On one side of the plate a circumferentially extending recess 16 is formed on the outer edges thus providing an abutment surface by which the plate 15 can rest on the upper edge of the walls 2–4. The plate 15 has on one side, FIG. 3, an approximately elliptical flat impression 17, over which is to be placed a diaphragm, not shown, and the edges thereof are glued to the plate around the impression. On the opposite side the plate 15 has, at one end, a wall formed projection 18 with two cylindrical projections 19 and 20 extending beyond the corresponding end edge of the plate. Close to the projection 18 there is placed a magnet 21 with a winding 22. The magnet is supported and guided by the wall part 18 on one side whereas at the other side it is supported by a relatively flat projection 23 with two cylindrical projections 24 and 25. Moreover, the magnet is supported and guided by a wall formed projection 26. The plate 15 has, in addition, some relatively small guiding and supporting projections, not shown in the drawing, serving for a reliable fixing of the magnet.

In the middle of the plate 15 there is provided a through-slot 27 for a band formed connecting rod 28 forming a connection between the diaphrgam and the armature of the magnet. At one corner of the plate 15 there is provided a through hole 29 to which there is joined a narrow, bent tubing 30. The cylindrical projections 19 and 20 are molded with a central through hole, not shown. The leads from the winding 22 are passed through these holes and are soldered at the outer end of the projections 19 and 20 thus providing a knob 31 serving as a terminal. When the mounting unit shown in FIGS. 2–4 thus is completely mounted it is placed in the housing part 1–5 in such a manner that the magnet 21 is turned downwards whereas the diaphragm is turned upwards. An edge part of the plate 15 rests on the upper edge of the walls 2–5. Thereafter the cover is mounted with its edge walls projecting downwards beyond the said edge portion of the plate 15. The hole 9 provides a sound aperture to the diaphragm.

The embodiment shown and described is only to be considered as an example, several modifications being possible within the scope of the invention.

Instead of the two holes 6 and 7 the housing 1–5 can be provided with incisions or cut-outs extending to the upper edge of the wall 2, whereby the placing of the mounting unit will be facilitated. When using such cut-outs there can, moreover, be obtained the advantage that the mounting unit first is placed in the cover whereafter a glue is filled into a circumferentially extending groove between the edge of the plate 15 and the walls 10–13 of the cover, after which the housing part 1–5 is placed with the edges of its walls extending into the groove with the glue. In this way the advantage is obtained that only one gluing operation is to be carried out. It is to be noted that this gluing operation serves to separate the spaces on the two sides of the diaphragm so that no uncontrolled leakage exists between them. An advantage is obtained by the above method in that it will be possible to test the mounting unit after the same has been placed in the cover and to make a possibly needed adjustment before mounting the housing part 1–5. It will also be possible to provide a mounting unit with projecting conduits which are connected to the leads of the magnet winding by soldering, and which project through apertures in the housing. This, too is part of the invention, since a complete test mounting unit is produced which is mounted in the housing without necessitating soldering during the mounting operation.

What is claimed is:

1. A microphone comprising a bipartite housing, a frame having prefixed components thereon and at least one electrical terminal for said components, said terminal being mounted in a selected location on said frame in the form of a projection extending beyond the periphery of said frame, said frame being mounted in said housing between the two parts thereof, and one of said housing parts being provided with an opening aligned with said terminal end through which said terminal projects.

2. A microphone as claimed in claim 1 wherein said frame is provided with two terminals and the one of said housing parts having corresponding openings through which said terminals project.

3. A microphone as claimed in claim 1 wherein said terminal is located at a side edge of said frame, and the corresponding opening in said housing part is in a side wall thereof.

4. A microphone as claimed in claim 1 wherein said terminal is a hollow projection through which an electrical connection passes, and further comprising an insulated sleeve surrounding said terminal in the openings of said housing part.

References Cited

UNITED STATES PATENTS

| | | | |
|---|---|---|---|
| 2,744,769 | 5/1956 | Roeder et al. | |
| 3,277,234 | 10/1966 | Dekko et al. | 339—126 |
| 2,829,202 | 4/1958 | Spera | 179—107 |
| 3,313,892 | 4/1967 | Mostardo et al. | 179—107 |

KATHLEEN H. CLAFFY, Primary Examiner

JAN S. BLACK, Assistant Examiner

U.S. Cl. X.R.

179—107